United States Patent Office 2,693,469
Patented Nov. 2, 1954

2,693,469

MANUFACTURE OF INDANTHRENE

Hermann Thielert, Leverkusen-Wiesdorf, and Fritz Baumann, Leverkusen-Bayerwerk, Germany, assignors to Farbenfabriken Bayer Aktiengesellschaft, Leverkusen-Germany, a corporation of Germany No Drawing. Application November 13, 1951,
Serial No. 256,118

3 Claims. (Cl. 260—263)

This invention relates to the manufacture of N,N'-dihydroanthraquinone-azine from 1-aminoanthroquinone.

The blue vat dyestuff known under the name "Indanthren," the N,N'-dihydroanthraquinone-azine is produced on a technical scale by melting 2-amino-anthraquinone with potassium hydroxide. Many attempts were made to use in this synthesis 1-amino-anthraquinone which, like 2-amino-anthraquinone, is easily accessible. For instance, the German Patent No. 175,626 describes the manufacture of the dyestuff by melting 1 part by weight of 1-amino-anthraquinone with 10 parts by weight of phenol and 5 parts by weight of potassium hydroxide at higher temperatures, if necessary in the presence of an oxidation agent. In German Patents Nos. 186,636 and 186,637 it has further been proposed to convert 1-amino-anthraquinone to N,N'-dihydroanthraquinone-azine by boiling in mineral acids or by heating with metallic sulfates or chlorides under pressure. According to German Patent No. 161,923 N,N'-dihydroanthraquinone-azine is obtained by introducing chlorine or bromine into molten 1-amino-anthraquinone.

All previously known methods of producing N,N'-dihydroanthraquinone-azine from 1-amino-anthraquinone, however, display the disadvantage that the yields obtained are substantially lower than those obtained from 2-amino-anthraquinone and potassium hydroxide.

We have found that N,N'-dihydroanthraquinone-azine is formed in a very good yield by melting 1 part by weight of 1-amino-anthraquinone with an alkali phenolate in a quantity substantially not exceeding 3 to 4 parts by weight, in the presence of an oxidation agent and an alkali metal salt of a lower fatty acid. The reaction may be carried out under pressure. Surprisingly, the yields are considerably increased as compared with the yield obtained according to the process described in German Patent No. 175,626. By applying the optimum conditions described below, the yields are even higher than those obtained by melting 2-amino-anthraquinone with potassium hydroxide. The essential difference of the new process from the prior art method consists in using smaller quantities of an alkali phenolate and adding alkali metal salts of lower fatty acids. Preferably, 1 to 2 parts by weight of an alkali phenolate per 1 part of 1-amino-anthraquinone are employed. Phenol and potassium hydroxide shall not be present in excess. Suitable alkali metal salts of lower fatty acids according to the invention are especially sodium and potassium acetate; furthermore, sodium and potassium formate, -propionate, and -butyrate may also be used. As examples of oxidation agents there may be mentioned alkali chlorates, alkali nitrates, potassium persulfate, and the like. The optimum reaction temperatures are between 150 and 200° C., however, it is of advantage to start the reaction at the said lower temperature and to slowly raise the temperature during reaction. Small quantities of ferric oxide or manganese dioxide are preferably added to the melt.

Apart from the fact that according to the new process the dyestuff is obtained in a very good yield the present invention permits of recovering from the crude dyestuff or the residue formed in the purification process, a larger portion of the unreacted 1-amino-anthraquinone in a simple manner, for instance by sublimation in vacuum or another operation easily to be performed.

The invention is further illustrated by the following examples without being restricted thereto, the parts being by weight.

Example 1

100 parts of potassium hydroxide (90%) are introduced into 150 parts of molten phenol at 100 to 120° C. The resultant potassium phenolate is mixed with 40 parts of anhydrous sodium acetate at 160 to 180° C. A mixture of 100 parts of 1-amino-anthraquinone (98%) and 5 to 20 parts of sodium chlorate is introduced in portions within 30 to 60 minutes into the thinly liquid melt; finally, 1 part of iron oxide or manganese dioxide is added. The melt is heated to 200° C. and stirred for 2½ hours to 7 hours while gradually increasing the temperature to 210° C.

The melt remaining thinly liquid during reaction is then heated to boiling in 3000 parts of water for about one hour. The resultant crude dyestuff is sucked off, washed and dried. After dissolution in concentrated sulfuric acid, the sulfuric acid concentration is adjusted to about 83% by addition of water whereupon N,N'-dihydroanthraquinone-azine precipitates in pure form and well crystallized. 68.2 parts of the pure dyestuff are thus obtained. The yield amounts to 70% calculated on the 1-amino-anthraquinone used.

By further diluting the filtrate containing sulfuric acid by addition of water, a grey-brown product precipitates from which the larger part of the unreacted 1-amino-anthraquinone is recovered by sublimation in vacuum. 9.6 parts of 1-amino-anthraquinone are thus recovered. The yield of the dyestuff amounts to about 77.5% calculated on the reacted part of 1-amino-anthraquinone.

In the above reaction the use of 200 parts of 1-amino-anthraquinone and 34 parts of sodium chlorate and the increase of the temperature from 190 to 220° C. within 8½ hours likewise results in a good yield of the dyestuff.

By replacing in the above reaction the anhydrous sodium acetate by equivalent quantities of sodium formate, sodium proprionate or sodium butyrate the dyestuff is obtained in an equally good yield.

The crude dyestuff may also be obtained by purification of the leuco compound of N,N'-dihydroanthraquinone-azine.

The dyestuff thus obtained yields on textile materials blue dyeings and prints of excellent fastness properties.

Example 2

By repeating the procedure of Example 1, however, replacing the potassium hydroxide by 75 parts of sodium hydroxide and the sodium acetate by 40 parts of potassium acetate, N,N'-dihydroanthraquinone-azine is also obtained in a good yield.

Example 3

A mixture of 100 parts of potassium phenolate
20 parts of sodium acetate
50 parts of 1-amino-anthraquinone
5 parts of potassium chlorate is heated and stirred for some hours as described in Example 1. After working up as described in Example 1 the melt yields N,N'-dihydroanthraquinone-azine in a good yield.

Example 4

This example describes carrying out the reaction under pressure.

A mixture of 100 parts of potassium phenolate
20 parts of sodium acetate
50 parts of 1-amino-anthraquinone
9 parts of potassium chlorate is heated in an autoclave provided with a stirrer at 150 to 160° C. for 4 to 8 hours and then at 180 to 190° C. for a further 2 to 4 hours. After working up as described in Example 1 the melt yields N,N'-dihydroanthraquinone-azine in a good yield.

We claim:
1. Process for the manufacture of N,N'-dihydroanthraquinone-azine which comprises heating together 1 part by weight of 1-aminoanthraquinone with less than

4 parts by weight of an alkali phenolate, an alkali salt of a lower fatty acid, and an oxidation agent selected from the group consisting of alkali chlorates, alkali nitrates and alkali persulfates, and catalytic amounts of a compound selected from the group consisting of ferric oxide and manganese dioxide at temperatures of about 150 to 200° C.

2. Process for the manufacture of N,N'-dihydroanthraquinone-azine which comprises heating together 1 part by weight of 1-aminoanthraquinone with 2 parts by weight of an alkali phenolate, an alkali salt of a lower fatty acid, and an oxidation agent selected from the group consisting of alkali chlorates, alkali nitrates and alkali persulfates, and catalytic amounts of a compound selected from the group consisting of ferric oxide and manganese dioxide at temperatures of about 150 to 200° C.

3. Process for the manufacture of N,N'-dihydroanthraquinone-azine which comprises heating together 1 part by weight of 1-aminoanthraquinone with 2 parts by weight of an alkali phenolate, an alkali acetate, and an oxidation agent selected from the group consisting of alkali chlorates, alkali nitrates and alkali persulfates, and catalytic amounts of a compound selected from the group consisting of ferric oxide and manganese dioxide at temperatures of about 150 to 200° C.

References Cited in the file of this patent

Hackh's Chemical Dictionary (2nd Ed.) (1937) page 443.